(12) United States Patent
Uoi et al.

(10) Patent No.: US 7,885,731 B2
(45) Date of Patent: Feb. 8, 2011

(54) INPUT CONTROL APPARATUS AND INPUT CONTROL METHOD

(75) Inventors: Hirotaka Uoi, Shijonawate (JP); Ayako Suzuki, Shijonawate (JP)

(73) Assignee: Osaka Electro-Communication University, Osaka (JP)

( * ) Notice: Subject to any disclaimer, the term of this patent is extended or adjusted under 35 U.S.C. 154(b) by 0 days.

(21) Appl. No.: 12/445,261

(22) PCT Filed: Oct. 11, 2006

(86) PCT No.: PCT/JP2006/320283

§ 371 (c)(1),
(2), (4) Date: Dec. 30, 2009

(87) PCT Pub. No.: WO2008/044287

PCT Pub. Date: Apr. 17, 2008

(65) Prior Publication Data

US 2010/0114402 A1    May 6, 2010

(51) Int. Cl.
*G05D 1/00* (2006.01)

(52) U.S. Cl. ............... 701/1; 701/33; 701/36; 340/425.5; 340/439

(58) Field of Classification Search .............. 701/1, 701/33, 35, 36; 340/425.5, 438, 439
See application file for complete search history.

(56) References Cited

U.S. PATENT DOCUMENTS 6,203,427 B1 *  3/2001  Walker et al. ............. 463/16

2001/0055991 A1    12/2001  Hightower

FOREIGN PATENT DOCUMENTS

| JP | 10-156043 | 6/1998 |
|----|-----------|--------|
| JP | 2001-197560 | 7/2001 |
| JP | 2002-250636 | 9/2002 |
| JP | 2002-537960 | 11/2002 |
| JP | 2005-58383 | 3/2005 |

OTHER PUBLICATIONS

International Search Report issued in PCT/JP2006/320283 mailed Jan. 16, 2007 (with English translation).
International Preliminary Report on Patentability issued in PCT/JP2006/320283 mailed Jun. 11, 2009 (with English translation).

* cited by examiner

*Primary Examiner*—Gertrude Arthur Jeanglaud
(74) *Attorney, Agent, or Firm*—Foley & Lardner LLP

(57) ABSTRACT

A mobile unit input control apparatus can include an operation member, output means, determining means, display control means, input control means, and driving control means. A mode determining unit of the mobile unit input control apparatus can determine whether a driving mode is to be set or not and whether a text input mode is to be set or not in accordance with an operation signal supplied from an operation input apparatus and notifies it to an operation detecting unit. The operation detecting unit detects and analyzes the operation signal supplied from the operation input apparatus and outputs operation information as the analysis result to a text input control unit, for example. On the basis of the operation information, the text input control unit outputs a text input screen, for example, to the multi-display apparatus.

4 Claims, 10 Drawing Sheets

| | DRIVING MODE | TEXT INPUT MODE |
|---|---|---|
| STEERING WHEEL | CHANGE TRAVELING DIRECTION | CURSOR LEFT/RIGHT MOVEMENT |
| GEAR SHIFT LEVER | SHIFT GEARS | CURSOR UP/DOWN MOVEMENT |
| GAS PEDAL | CHANGE ACCELERATION | DETERMINE |
| BRAKE PEDAL | CHANGE DECELERATION | CANCEL |
| ⋮ | ⋮ | ⋮ |

INPUT CONTROL APPARATUS AND INPUT CONTROL METHOD

CROSS-REFERENCE TO RELATED APPLICATIONS

The present application is a U.S. national stage application claiming the benefit of International Application No. PCT/JP2006/320283, filed on Oct. 11, 2006, the entire contents of which is incorporated herein by reference in its entirety.

BACKGROUND

The present invention relates to a mobile unit input control apparatus, for example, mounted in a mobile unit such as an automobile and a motor cycle.

In recent years, multiple peripheral apparatus such as a car navigation system, a music player, a mobile telephone apparatus and an air conditioner are mounted on an instrument panel of an automobile. In order to provide the commonality of a display unit and an operation unit across those apparatus, a mode-switchable multi-display is arranged on the instrument panel, and a touch panel functioning as the operation unit for those apparatus is provided on the screen of the multi-display (refer to Unexamined JP Patent Application Publication No. 2001-197560, for example). In order to use a peripheral apparatus such as a car navigation system and a mobile telephone apparatus, a user may operate switches on the touch panel displayed on the multi-display to select a peripheral apparatus to use (such as the car navigation system). By manipulating the touch panel to perform text input for the address to be searched or to input a telephone number, a desirable destination can be defined.

SUMMARY

The use of such a touch panel may require a user to press a panel switch on a numeric keypad on the touch panel displayed on the screen of the multi-display by checking (or touching) its position with his/her eyes and finger for the text input operation for an address or an input operation for a telephone number, which may cause a problem that an operational error relating to the switches may occur easily and it is difficult to use. Furthermore, in order to manipulate the touch panel, he/she must move his/her hands off the steering wheel, which causes a problem that the security is not provided. There is another problem that a user is required to perform complicated works including newly learning operations for the text input.

The present invention was made in view of the above-described situations, and it is an object of the present invention to provide an input control technology that allows performing text input on a peripheral apparatus mounted in a mobile unit such as an automobile in the same way as driving operations and allows performing text input safely.

In order to solve the problems, a mobile unit input control apparatus according to the present invention is characterized by including an operation member for controlling driving by a mobile unit, output means for detecting an operation by the operation member and outputting an operation signal, determining means for determining whether it is under a driving mode or a text input mode, display control means for displaying selectable text input candidates on a display apparatus if the determining means determines that it is under the text input mode, and input control means for controlling text input on the basis of the operation signal if the determining means determines that it is under the text input mode and if the operation signal is received from the output means.

According to the configuration, in order to perform the text input on a peripheral apparatus mounted in a vehicle, an operation member (such as a steering wheel and a gear shift lever) for controlling driving is used. Therefore, without performing complicated works including newly learning operations for the text input, the text input can be performed in the same way as driving operations. This allows performing the text input fast and safely.

Here, an aspect is preferable in which the mobile unit is a vehicle, the operation member includes a steering wheel, a gear shift lever, a gas pedal and a brake pedal, the operation signal includes identification information for identifying an operation member, the input control means has an operation analysis table on which a kind of operation is assigned to the corresponding operation member, and, if the input control means receives the operation signal, the input control means refers to the identification information included in the operation signal and the operation analysis table to identify the kind of operation, detects a manipulated variable on the basis of the operation signal, controls the text input on the basis of the identified kind of operation and the detected manipulated variable.

Another aspect is also preferable in which the kind of operation includes selecting, determining and cancelling a character to be input, the selection of a character to be input is assigned to the steering wheel and the gear shift lever, the determination of a character to be input is assigned to the gas pedal, and the cancel of a character to be input is assigned to the brake pedal.

A mobile unit input control method according to the present invention is characterized by including an outputting step of detecting an operation by an operation member for controlling driving by a mobile unit and outputting an operation signal, a determining step of determining whether it is under a driving mode or a text input mode, a display step of displaying selectable text input candidates on a display apparatus if the determining step determines that it is under the text input mode, and an input control step of controlling text input on the basis of the operation signal if the determining step determines that it is under the text input mode and if the operation signal is received from the output means.

As described above, the present invention allows performing text input on a peripheral apparatus mounted in a mobile unit such as an automobile in the same way as driving operations and allows performing text input safely.

DETAILED DESCRIPTION

With reference to drawings, an illustrative embodiment will be described below.

Figure 1:
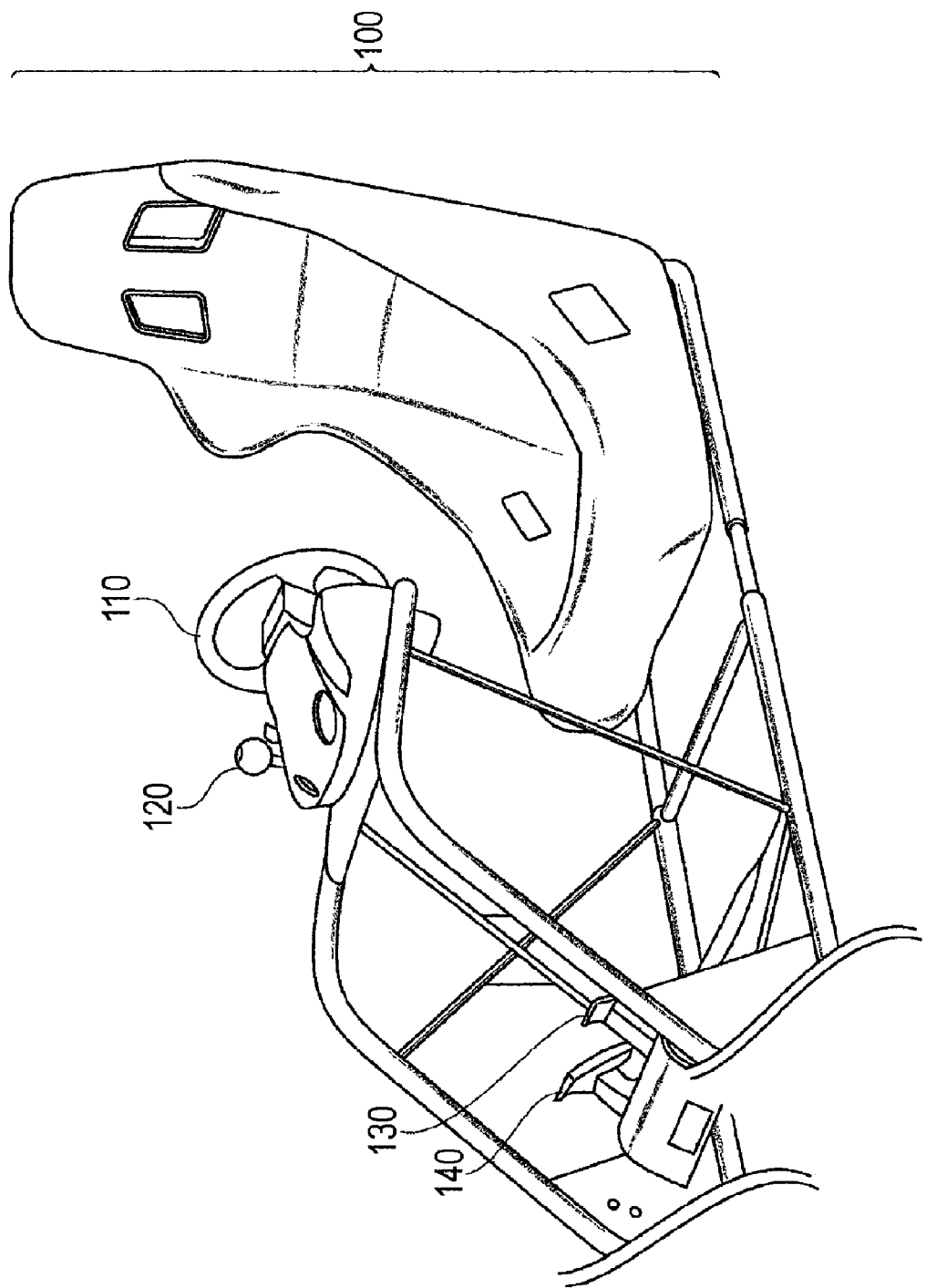
FIG. 1 is a diagram showing an external configuration of an operation input apparatus according to an embodiment.
Figure 2:
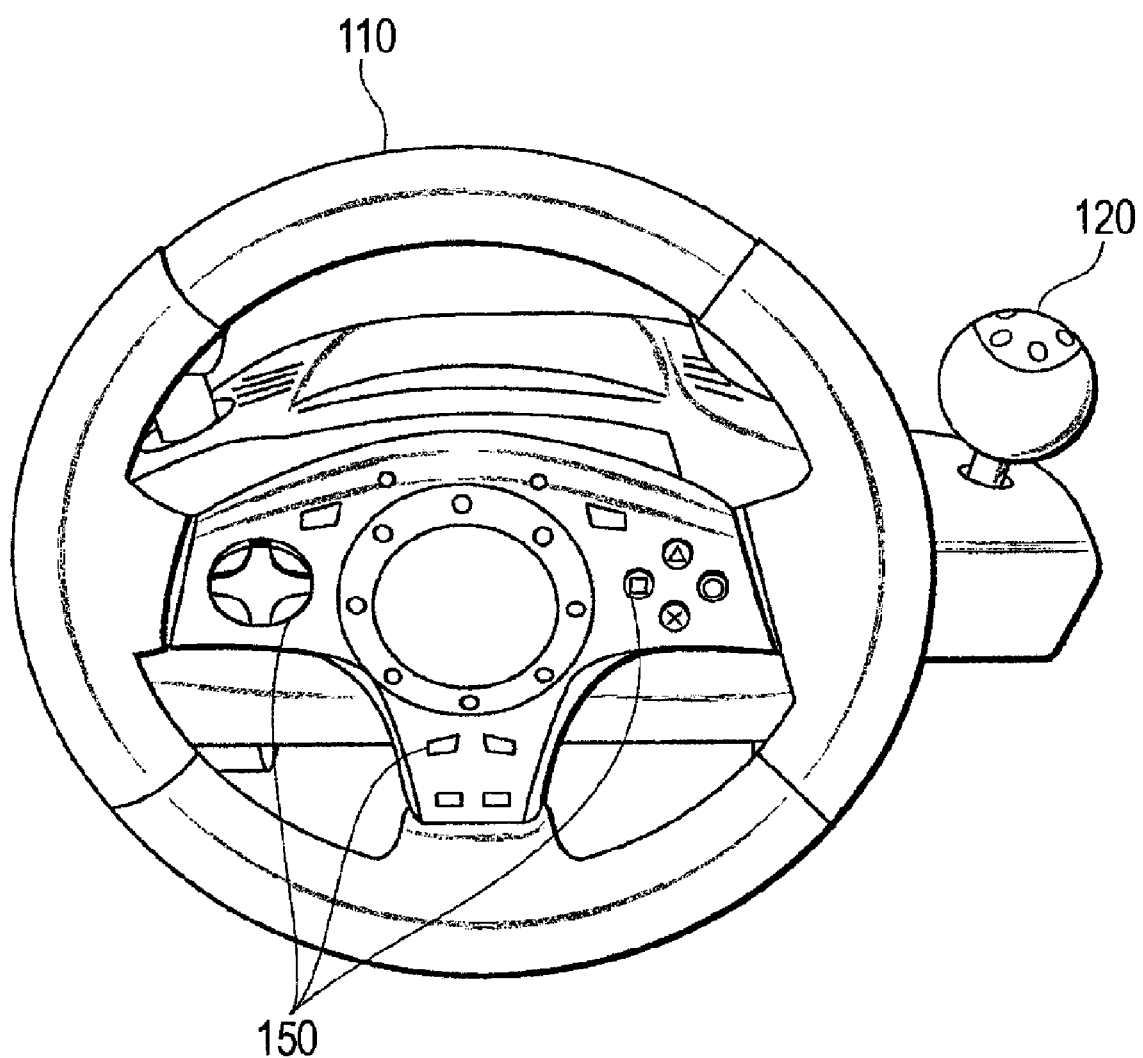
FIG. 2 is an enlarged view of a steering wheel part according to the embodiment.
Figure 3:
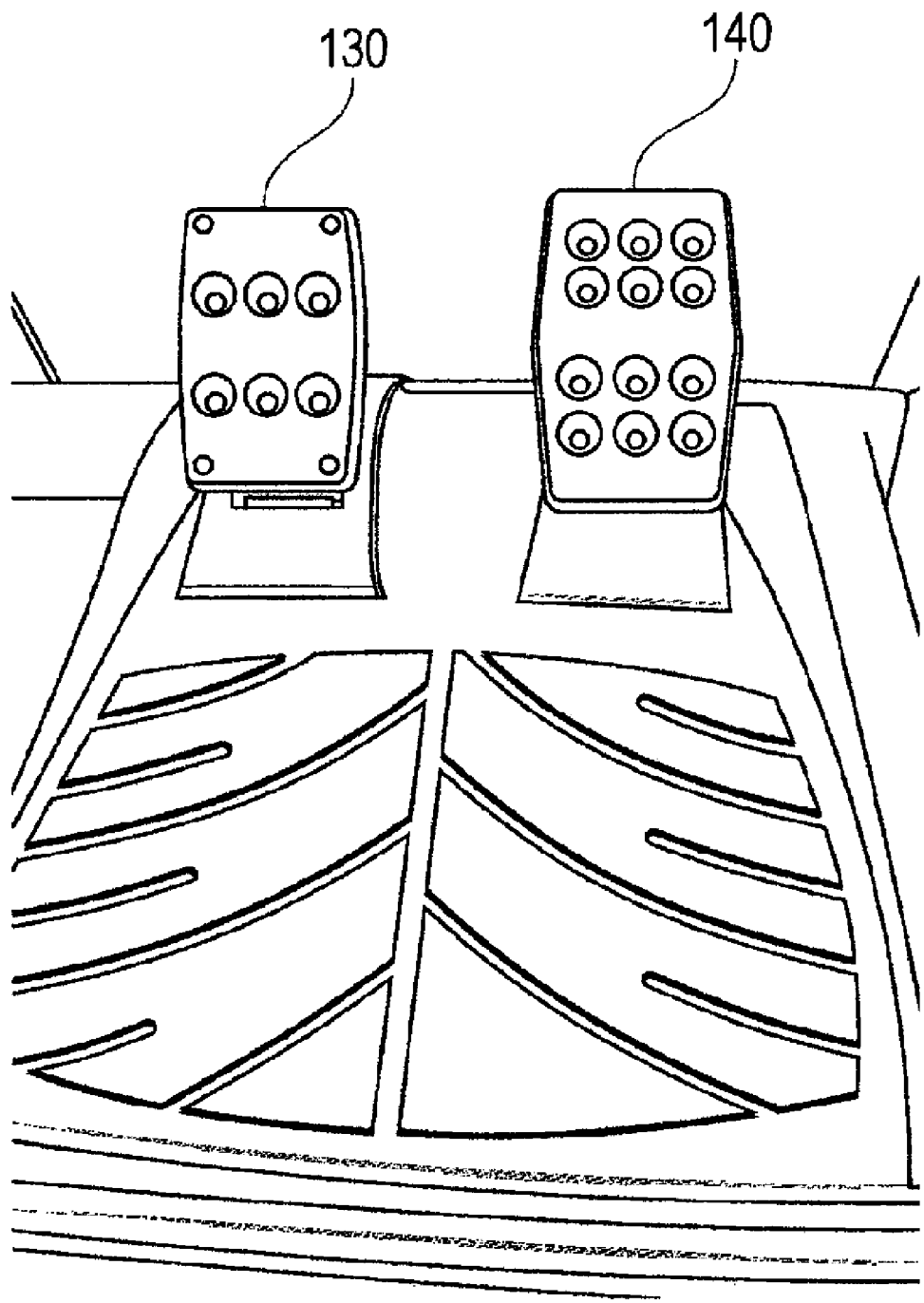
FIG. 3 is an enlarged view of a pedal part according to the embodiment.

FIG. 1 is a diagram showing an external configuration of an operation input apparatus 100 to be mounted in an automobile, FIG. 2 is an enlarged view of a steering wheel part, and FIG. 3 is an enlarged view of a pedal part.

The operation input apparatus 100 is an apparatus for inputting operations for driving and is composed of multiple operation members. More specifically, the operation input apparatus 100 includes a steering wheel (operation member) 110 for switching the direction of travel of a vehicle, a gear shift lever (operation member) 120 for performing a gear shift, a gas pedal (operation member) 130 for changing the acceleration of a vehicle, a brake pedal (operation member) 140 for changing the deceleration of a vehicle, and an operation button group (operation member) 150 for inputting commands. As shown in FIG. 2, the operation button group 150 including operation buttons and operation switches is provided on the steering wheel 110. If a user manipulates one of the operation members (such as the steering wheel), the operation input apparatus (output means) 100 outputs an operation signal including identification information for identifying the operation member to an operation detecting unit 320.

Figure 4:
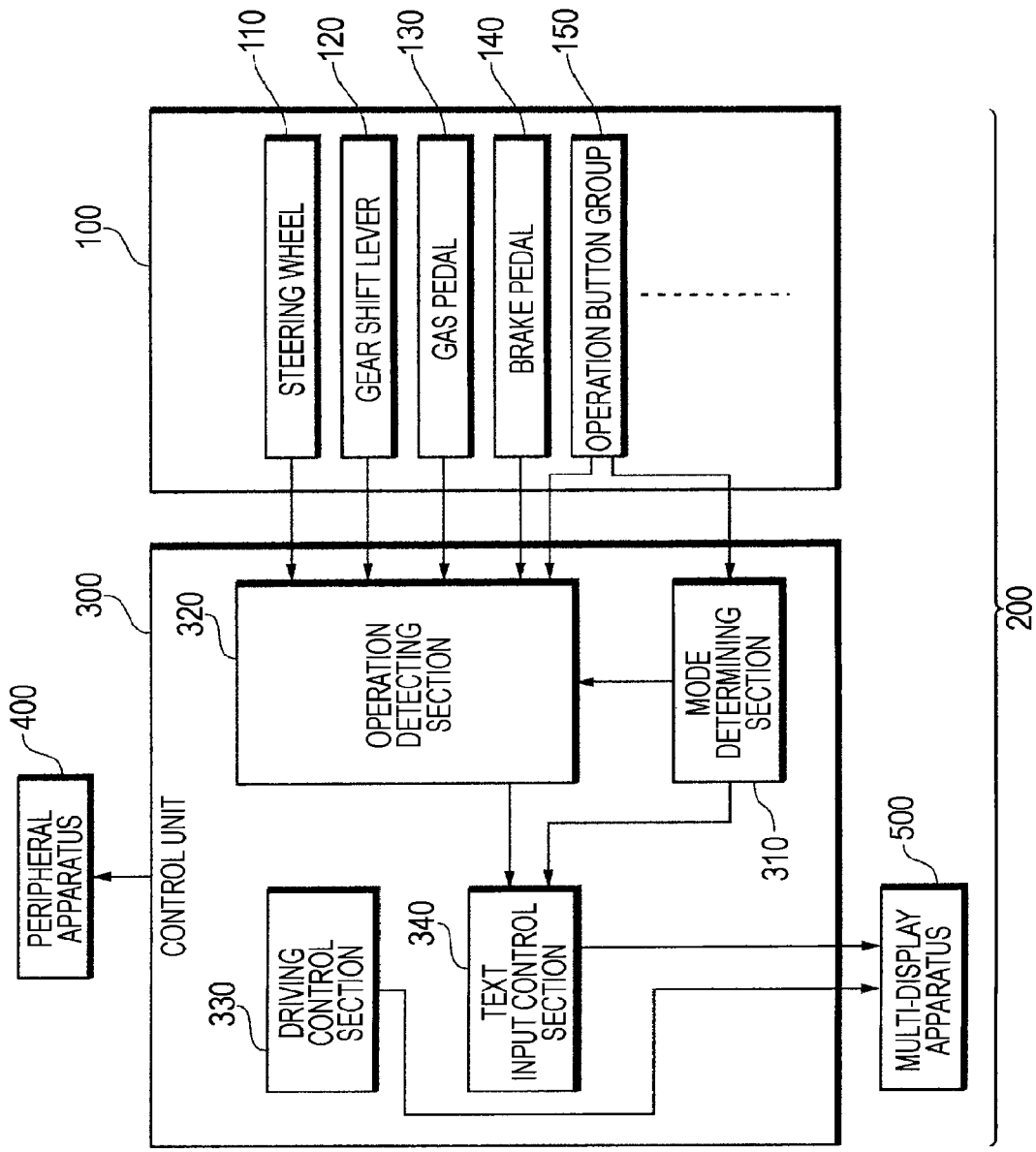
FIG. 4 is a diagram showing a configuration of an input control apparatus according to the embodiment.

FIG. 4 is a diagram showing a configuration of an input control apparatus 200 employing the operation input apparatus 100. The input control apparatus 200 includes the operation input apparatus 100 and a control unit 300. The control unit 300 is composed of a CPU centrally controlling the components, a ROM storing control programs and control data, for example, a RAM operating as a work area for the CPU and storing data temporarily, and an input/output circuit performing input/output of data.

A peripheral apparatus 400 composed of a navigation system, a music player, an air conditioner, a mobile telephone apparatus and so on and a multi-display apparatus 500 are connected to the control unit 300. The control unit 300 displays a screen required under a mode (such as a driving mode and a text input mode, the details of which will be described later) on the multi-display apparatus 500 and performs control on the basis of a signal output from the operation input apparatus 100.

The multi-display apparatus (display apparatus) 500 may be configured by a liquid crystal display, for example, and display information on a setting of the peripheral apparatus 400 (such as map information of a car navigation system) with the driving mode set and displays selectable text input candidates (such as numbers "0" to "9", alphabets "A" to "z" and hirakanas "A" to "N") with the text input mode set.

Now, the detail configuration of the control unit 300 will be described. The control unit 300 implements the functions of a mode determining unit 310, an operation detecting unit 320, a driving control unit 330 and a text input control unit 340. The mode determining unit (determining means) 310 determines whether the driving mode is to be set or not and whether the text input mode is to be set or not in accordance with the operation signal supplied from the operation input apparatus 100 and notifies the result to the operation detecting unit 320.

More specifically, if the operation input apparatus 100 inputs that the vehicle is stopped and the operation signal indicating that the text input mode is to be set (such as the operation signal when a predetermined operation button is pressed), it is determined that the "text input mode" is to be set. In the other cases, it is determined that the "driving mode" is to be set. Notably, the criterion for determination of whether the driving mode is to be set or the text input mode is to be set can be defined properly in accordance with the design of the input control apparatus 200. If the mode determining unit 310 determines that the text input mode is to be set, the determination result is output to the text input control unit 340.

Figure 5:
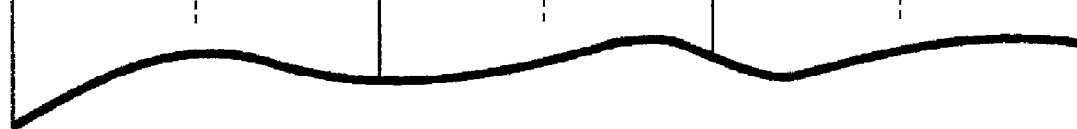
FIG. 5 is a diagram illustrating an operation analysis table according to the embodiment.

The operation detecting unit (input control means) 320 refers to an operation analysis table TA shown in FIG. 5 to detect and analyze the operation signal supplied from the operation input apparatus 100 and outputs the operation information as the analysis result to the driving control unit 330 and the text input control unit 340. FIG. 5 is a diagram illustrating the operation analysis table TA stored in a memory 321. On the operation analysis table TA, a kind of operation under the corresponding mode is assigned to the corresponding operation member. More specifically, rotating the steering wheel 110 causes "change the traveling direction (under the driving mode)" or "cursor left/right movement (under the text input mode)". Manipulating the gear shift lever 120 upward or downward causes "shift gears (under the driving mode)" or "cursor up/down movement (under the text input mode)". Similarly, stepping on the gas pedal 130 causes "change acceleration (under the driving mode)" or causes "determine (under the text input mode)". Stepping on the brake pedal 140 causes "change deceleration (under the driving mode)" or "cancel (under the text input mode)". Notably, kinds of operation are also assigned to the operation buttons 150 and other operation members.

If the operation detecting unit 320 receives the operation signal from the operation input apparatus 100, the operation detecting unit 320 refers to the identification information included in the operation signal and the operation analysis table TA to determine which operation member (such as the "steering wheel") has performed the operation. Then, the operation detecting unit 320 grasps either driving mode or text input mode as the set mode and refers to the operation analysis table TA to identify the kind of the operation. Then, regarding the identified kind of the operation (such as the "cursor left/right movement" if under the "text input mode"), the operation detecting unit 320 detects the manipulated variable (such as the amount of travel of a cursor) on the basis of the operation signal and determines the operation on the basis of the detected manipulated variable and the identified kind of operation. Then, the operation detecting unit 320 outputs the operation information describing the determined operation (such as "Select "A" as input character") to the driving control unit 330 and the text input control unit 340.

The driving control unit 330 if the driving mode is set controls the driving of the vehicle on the basis of the operation information output from the operation detecting unit 320 and outputs an operation screen for the peripheral apparatus 400 relating to driving (such as the screen showing the map by a navigation system) to the multi-display apparatus 500.

Figure 6:
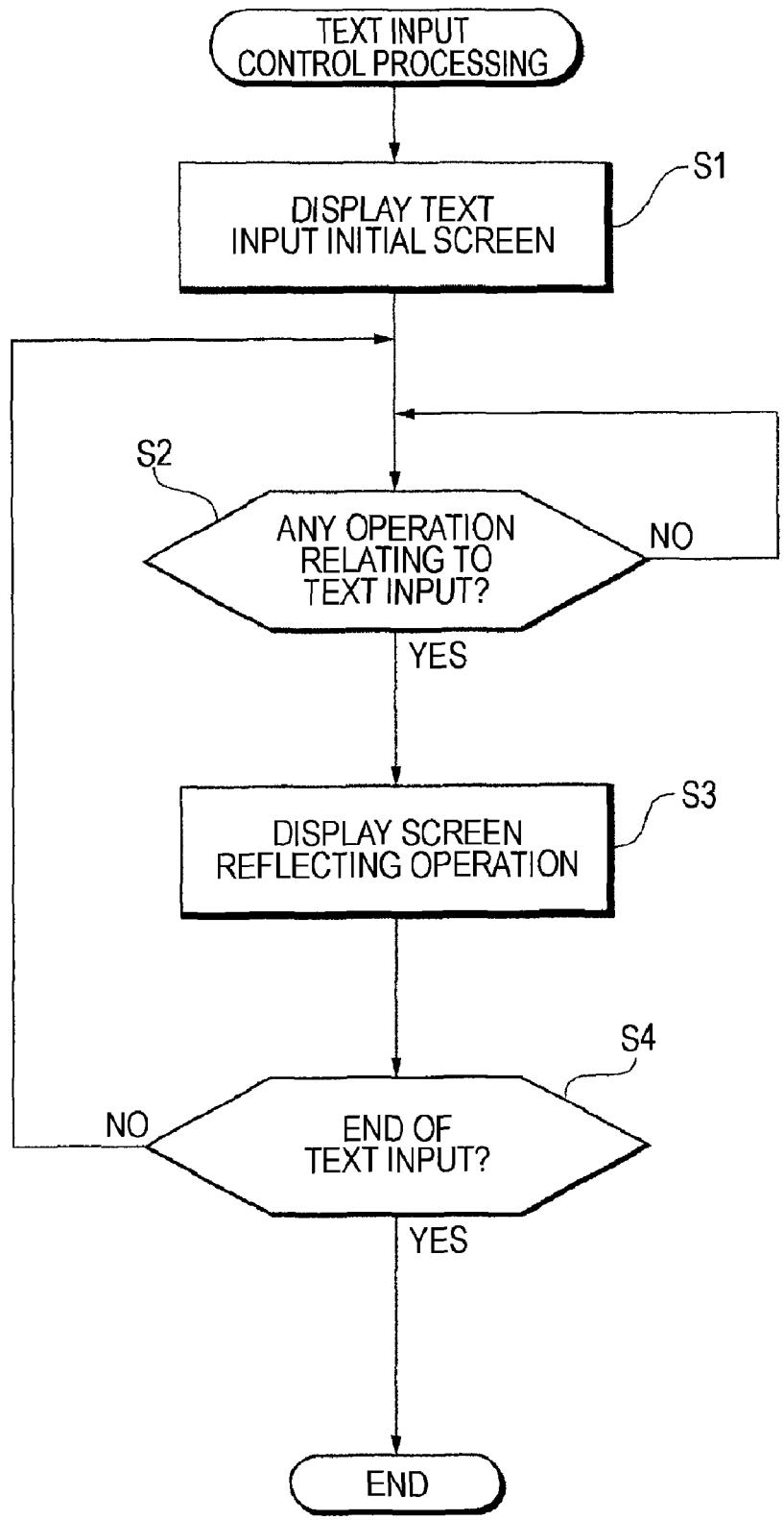
FIG. 6 is a flowchart for illustrating operations by the input control apparatus according to the embodiment.

If the text input control unit (display control means) 340 receives the determination result to be set under the text input mode from the mode determining unit 310, the text input control unit 340 displays selectable multiple text input candidates on the display screen of the multi-display apparatus 500. The text input control unit 340 outputs the text input screen (such as the screen for inputting the address of a navigation system) to the multi-display apparatus 500 on the basis of the operation information output from the operation detecting unit 320. With reference to FIG. 6 and so on, the operations by the input control apparatus 200 will be described below.

FIG. 6 is a flowchart for illustrating operations by the input control apparatus 200. Although, the following description assumes the case where the vehicle is stopped and a user inputs an address in a navigation system, the same is applicable to cases where text is input in other peripheral apparatus 400 (such as inputting the name of a tune to a music player and inputting a telephone number of a mobile telephone).

A user desiring performing the text input pushes down a mode switching button (such as "driving mode"→"text input mode") when the vehicle stops. The operation signal describing that the mode switching button has been pushed is output from the operation input apparatus 100 to the mode determining unit 310. If the mode determining unit 310 determines that the "text input mode" is to be set on the basis of the operation signal, the mode determining unit 310 outputs the determination result to the operation detecting unit 320 and the text input control unit 340.

Figure 7:
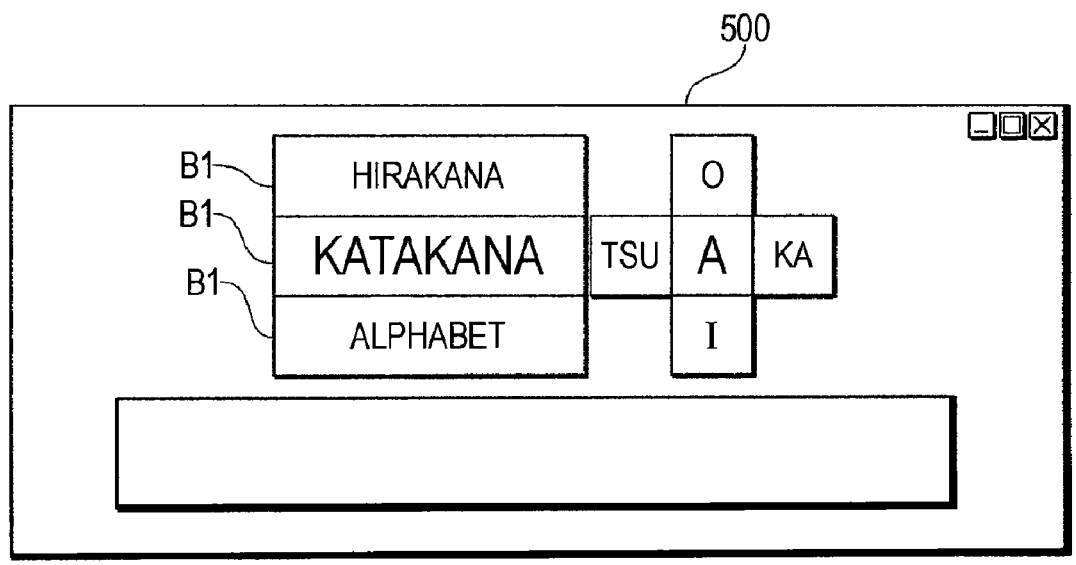
FIG. 7 is a diagram illustrating a display screen of a multi-display apparatus according to the embodiment.

If the text input control unit 340 receives the instruction to set the "text input mode" from the mode determining unit 310, the text input control unit 340 displays an initial screen displaying text input candidates, as shown in FIG. 7, on the multi-display apparatus 500 (step S1). As shown in FIG. 7, the left column of the initial screen displays character type selection buttons B1 representing three character types of four character types "hirakana", "katakana", "alphabet" and "number". The center of the initial screen displays five inputtable character buttons "A", "I" . . . in the shape of a cross.

Figure 8:
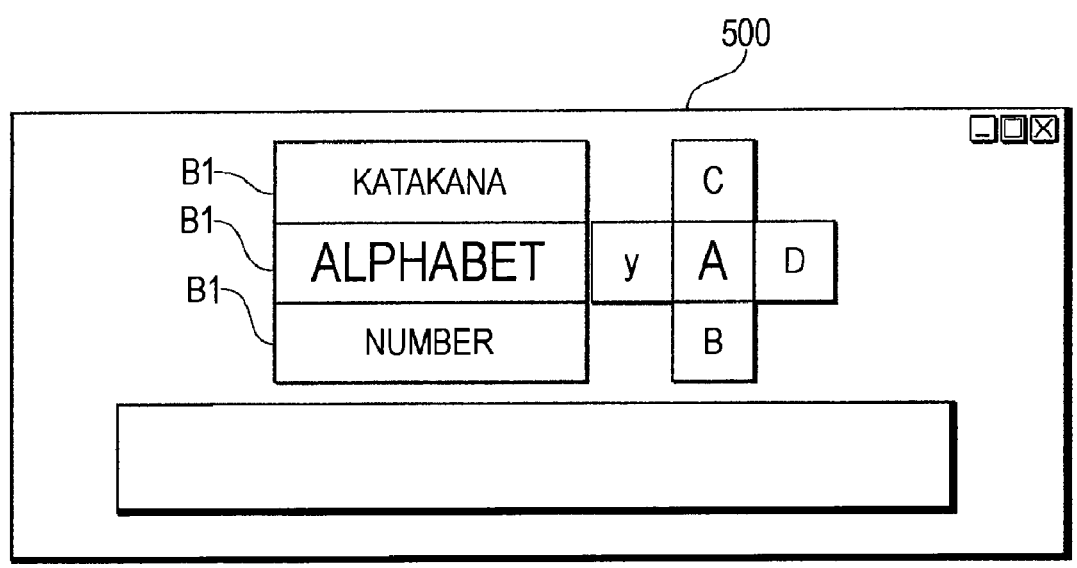
FIG. 8 is a diagram illustrating a display screen of a multi-display apparatus according to the embodiment.

The user may refer to the initial screen and perform the text input by manipulating the steering wheel 110, gear shift lever 120, gas pedal 130, brake pedal 140 and/or the operation button group 150 in the operation input apparatus 100 properly (or perform an operation relating to the text input). Describing more specifically, for example, in order to input a word "TOKYO", a user may manipulate the operation input apparatus 100 to change the character type from "katakana" to "alphabet" (refer to FIG. 7→FIG. 8) and input "TOKYO". As described above, the rotation of the steering wheel 110 instructs the "cursor left/right movement (select a character to input)", the up/down operation on the gear shift lever 120 instructs the "cursor up/down movement (select a character to input)", stepping on the gas pedal 130 instructs "determine (determine a character to input)", and stepping on the brake pedal 140 instructs "cancel (cancel the input character)" (refer to FIG. 5). A user may use the operation member such as the steering wheel 110 and gear shift lever 120 properly to perform an operation for selecting a character type or determining the text input (or an operation relating to the text input).

Figure 9:
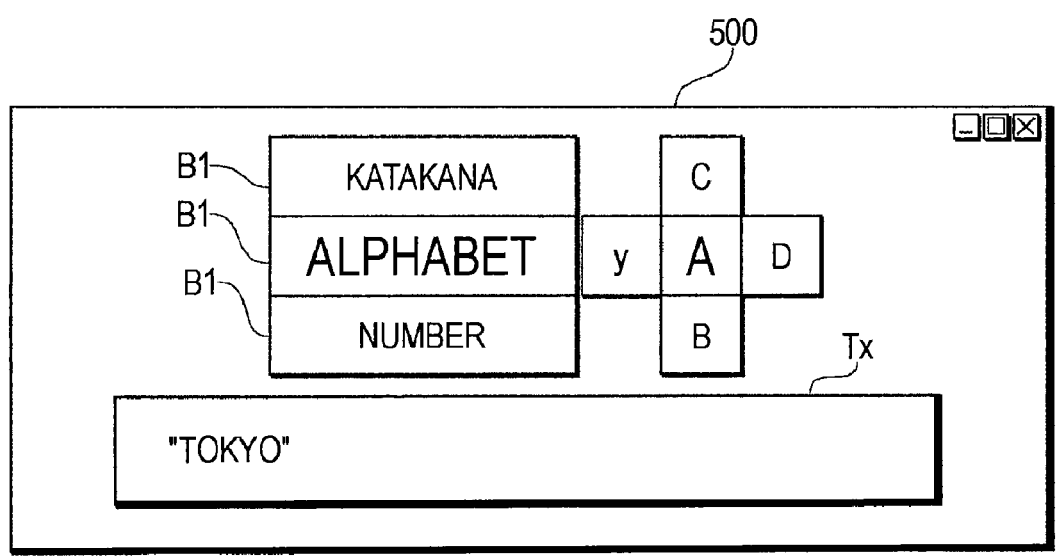
FIG. 9 is a diagram illustrating a display screen of a multi-display apparatus according to the embodiment.

If the operation detecting unit 320 detects that text input-related operation has been performed on the basis of the operation signal supplied from the operation input apparatus 100 (step S2), the operation detecting unit 320 analyzes the operation signal to determine the operation and outputs it as the operation information to the text input control unit 340. The text input control unit 340 displays an image reflecting the operation on the multi-display apparatus 500 in accordance with the operation information received from the operation detecting unit 320 (step S3). For example, if the character type is set to "alphabet" and "TOKYO" is input, an image showing "TOKYO" is displayed in a text area Tx on the display screen (refer to FIG. 8→FIG. 9).

After that, the operation detecting unit 320 determines whether the text input has ended or not (step S4). More specifically, the operation detecting unit 320 determines whether the text input has ended or not by detecting whether a button operation has been performed for ending the text input or not or whether no text input-related operations have been performed for a predetermined period of time (such as several tens minutes) from the shift to the text input mode or not, for example. If not, the operation detecting unit 320 returns to step S2 to perform a series of the steps. If so on the other hand, the processing ends.

As described above, according to this embodiment, in order to perform the text input on a peripheral apparatus mounted in a vehicle, an operation member (such as a steering wheel and gear shift lever) for controlling driving is used. Therefore, without performing complicated works including newly learning operations for the text input, the text input can be performed in the same way as driving operations. This allows performing the text input fast and safely.

Figure 10:
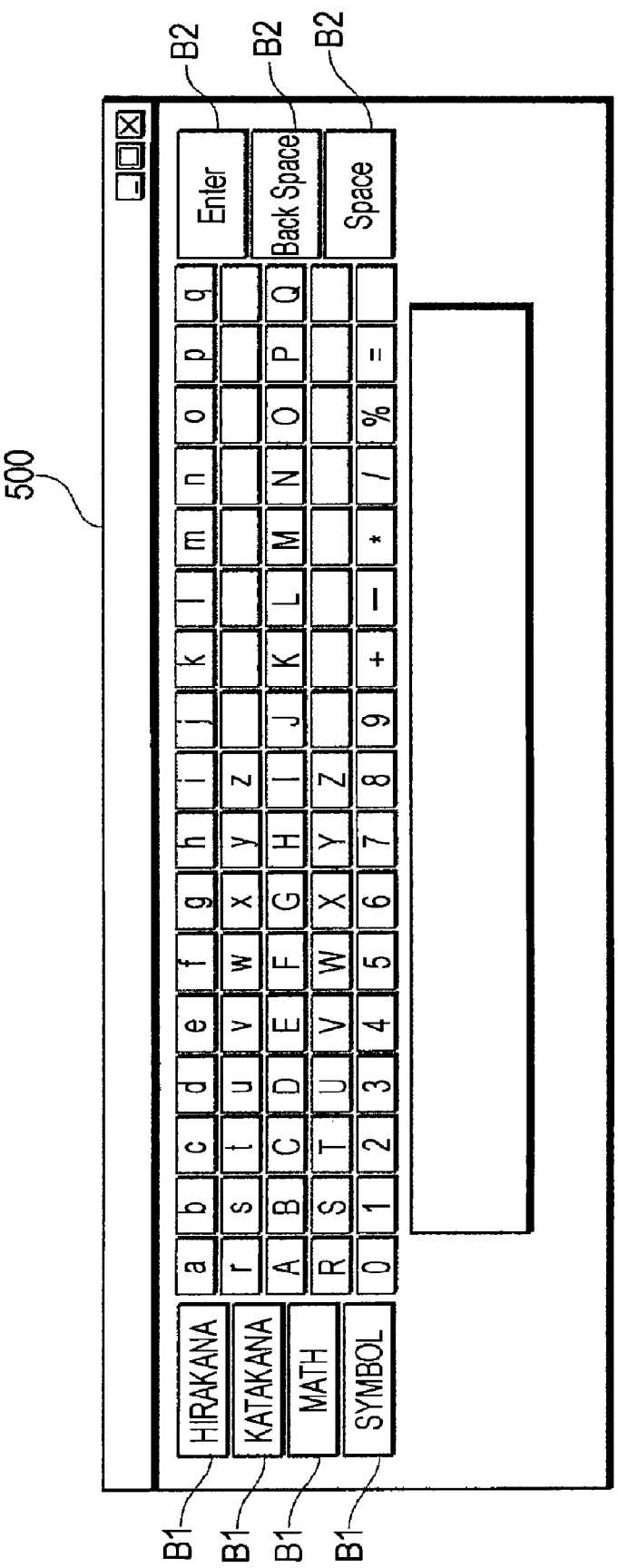
FIG. 10 is a diagram illustrating a display screen of a multi-display apparatus according to a variation example.

Having described the embodiment that the initial screen displaying text input candidates as shown in FIG. 7 is displayed on the multi-display apparatus 500, an initial screen displaying text input candidates as shown in FIG. 10 may be displayed on the multi-display apparatus 500.

Figure 11:
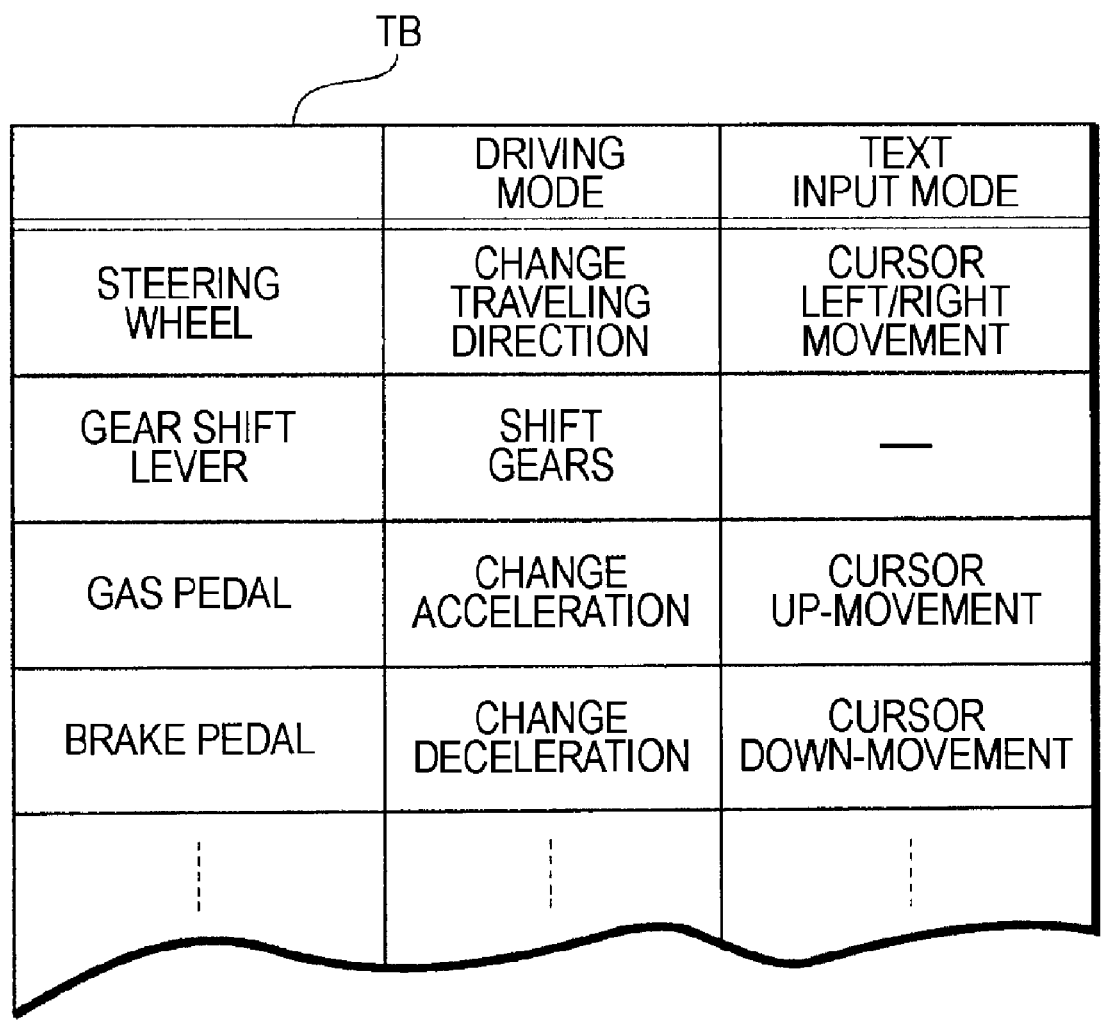
FIG. 11 is a diagram illustrating an operation analysis table according to the variation example.

FIG. 11 is a diagram illustrating an operation analysis table TB according to a variation example and is a diagram corresponding to FIG. 5. Comparing between FIG. 11 and FIG. 5, the kinds of operations assigned to the operation members are different from those in the embodiment. More specifically, rotating the steering wheel 110 causes "cursor left/right movement (under the text input mode)", stepping on the gas pedal 130 causes "cursor up movement (under the text input mode)", and stepping on the brake pedal 140 causes "cursor down movement (under the text input mode)".

Here, as shown in FIG. 10, the left column of the initial screen according to the variation example displays character type selection buttons B1 representing four character types of "hirakana", "katakana", "alphabet" and "number". The right column of the initial screen displays character selection-related buttons B2 of "Enter", "Backspace" and "space". The center of the initial screen displays inputtable character buttons "a", "b" . . . of m-rows by n-columns (where m≧1 and n≧1). A user may operate those operation members properly to perform similar operations as those in the embodiment.

Having described the embodiment that an automobile is illustrated as the vehicle, it is also applicable to a motorcycle with a displacement of 50 cc or more, a bus, a train or the like. Furthermore, it is also applicable to not only vehicles but also all mobile units including operation members for controlling driving such as a ship, an airplane and a robot. It is not intended that the characters to be input are limited to "hirakana", "katakana", "alphabet" and "number", but it is applicable to all characters including "kanji", for example.

REFERENCE NUMERALS

100 operation input apparatus
110 steering wheel
120 gear shift lever
130 gas pedal
140 brake pedal
150 operation button group
200 input control apparatus
300 control unit
310 mode determining unit
320 operation detecting unit
330 driving control unit 340 text input control unit
400 peripheral apparatus
500 multi-display apparatus
TA and TB operation analysis tables

The invention claimed is:

1. A mobile unit input control apparatus comprising:
an operation member for controlling driving by a mobile unit;
output means for detecting an operation by the operation member and outputting an operation signal;
determining means for determining whether it is under a driving mode or a text input mode on the basis of the operation signal input by a user manipulating the operation member;
display control means for displaying selectable text input candidates on a display apparatus when the determining means determines that it is under the text input mode;
input control means for controlling text input on the basis of the operation signal when the determining means determines that it is under the text input mode and when the operation signal is received from the output means; and
driving control means for controlling driving by the mobile unit on the basis of the input operation signal when the determining means determines that it is under the driving mode.

2. The input control apparatus according to claim 1, wherein the mobile unit is a vehicle;
the operation member includes a steering wheel, a gear shift lever, a gas pedal and a brake pedal;
the operation signal includes identification information for identifying an operation member; and
the input control means has an operation analysis table on which a kind of operation is assigned to the corresponding operation member, and, when the input control means receives the operation signal, the input control means refers to the identification information included in the operation signal and the operation analysis table to identify the kind of operation, detects a manipulated variable on the basis of the operation signal, controls the text input on the basis of the identified kind of operation and the detected manipulated variable.

3. The input control apparatus according to claim 2, wherein:
the kind of operation includes selecting, determining and cancelling a character to be input; and
the selection of a character to be input is assigned to the steering wheel and the gear shift lever, the determination of a character to be input is assigned to the gas pedal, and the cancel of a character to be input is assigned to the brake pedal.

4. A mobile unit input control method comprising:
an outputting step of detecting an operation by an operation member for controlling driving by a mobile unit and outputting an operation signal;
a determining step of determining whether it is under a driving mode or a text input mode on the basis of the operation signal input by a user manipulating the operation member;
a display step of displaying selectable text input candidates on a display apparatus when the determining step determines that it is under the text input mode;
an input control step of controlling text input on the basis of the operation signal when the determining step determines that it is under the text input mode and when the operation signal is received from the output means; and
a driving control step of controlling driving by the mobile unit on the basis of the input operation signal when the determining step determines that it is under the driving mode.

* * * * *